US011336377B1

(12) United States Patent
Papp et al.

(10) Patent No.: US 11,336,377 B1
(45) Date of Patent: May 17, 2022

(54) MILLIMETER-WAVE FREQUENCY SYNTHESIZER BASED ON MICROCOMB PHOTOMIXING, AND ASSOCIATED METHODS

(71) Applicants: THE REGENTS OF THE UNIVERSITY OF COLORADO, A BODY CORPORATE, Denver, CO (US); Government of the United States of America as represented by the Secretary of Commerce, Gaithersburg, MD (US)

(72) Inventors: Scott B. Papp, Boulder, CO (US); Jizhao Zang, Boulder, CO (US)

(73) Assignees: The Regents of the University of Colorado, a body corporate, Denver, CO (US); Government of the United States of America, as represented by the Secretary of Commerce, Gaithersburg, MD (US)

( * ) Notice: Subject to any disclaimer, the term of this patent is extended or adjusted under 35 U.S.C. 154(b) by 0 days.

(21) Appl. No.: 17/443,647

(22) Filed: Jul. 27, 2021

Related U.S. Application Data

(60) Provisional application No. 63/057,571, filed on Jul. 28, 2020.

(51) Int. Cl.
*H04B 10/58* (2013.01)
*H04B 10/54* (2013.01)
*H04B 10/548* (2013.01)

(52) U.S. Cl.
CPC ............. *H04B 10/58* (2013.01); *H04B 10/54* (2013.01); *H04B 10/548* (2013.01)

(58) Field of Classification Search
None
See application file for complete search history.

(56) References Cited

U.S. PATENT DOCUMENTS

| | | | | |
|---|---|---|---|---|
| 9,094,133 | B2 * | 7/2015 | Poddar | G02F 1/00 |
| 9,595,918 | B2 * | 3/2017 | Li | H03B 17/00 |
| 2015/0236784 | A1 * | 8/2015 | Vahala | H03L 7/08 |
| | | | | 398/115 |
| 2015/0236789 | A1 * | 8/2015 | Vahala | H04B 10/503 |
| | | | | 398/192 |

(Continued)

*Primary Examiner* — David W Lambert
(74) *Attorney, Agent, or Firm* — Lathrop GPM LLP

(57) ABSTRACT

A millimeter-wave frequency synthesizer generates a millimeter wave by photomixing two Kerr-soliton microcombs. A single-frequency laser beam is modulated to create first and second pump components having first and second pump frequencies. The first pump component excites a first microresonator to create a first microcomb while the second pump component excites a second microresonator to generate a second microcomb. A pair of comb lines from the two microcombs is detected to generate a low-frequency beat note that is phase-locked by identically tuning the pump frequencies. Another pair of comb lines is detected with a high-speed photodiode to generate the millimeter wave. The frequency of the millimeter wave is based on (i) the difference between the pump frequencies, (ii) the difference between the repetition rates, and (iii) the index of the comb lines that are photomixed to generate the millimeter wave.

20 Claims, 8 Drawing Sheets

(56) References Cited

U.S. PATENT DOCUMENTS

| | | | |
|---|---|---|---|
| 2015/0311662 A1* | 10/2015 | Vahala | H01S 3/302 |
| | | | 250/552 |
| 2016/0097963 A1* | 4/2016 | Fermann | H01S 3/0092 |
| | | | 359/276 |
| 2016/0254646 A1* | 9/2016 | Li | H01S 3/0627 |
| | | | 372/32 |
| 2017/0012705 A1* | 1/2017 | Vahala | H04B 10/503 |
| 2018/0048113 A1* | 2/2018 | Fermann | H01S 3/0085 |
| 2018/0180655 A1* | 6/2018 | Kuse | G01R 29/26 |
| 2021/0286230 A1* | 9/2021 | Wong | H01S 5/0427 |

* cited by examiner

MILLIMETER-WAVE FREQUENCY SYNTHESIZER BASED ON MICROCOMB PHOTOMIXING, AND ASSOCIATED METHODS

RELATED APPLICATIONS

This application claims priority to U.S. Provisional Patent Application No. 63/057,571, filed Jul. 28, 2020 and titled "Millimeter-Wave Frequency Synthesizer, Using Integrated-Photonics Frequency Combs", which is incorporated herein by reference in its entirety.

STATEMENT REGARDING FEDERALLY SPONSORED RESEARCH OR DEVELOPMENT

This invention was made with government support under grant number 70NANB18H006 awarded by the NIST and grant number HR0011-15-C-0055 awarded by DARPA. The government has certain rights in the invention.

BACKGROUND

Millimeter-wave frequency synthesizers generate stable and tunable millimeter waves for applications including radar, spectroscopy, and wireless communications. Conventional frequency synthesizers are based on electronics, and usually incorporate a voltage-controlled oscillator, harmonic generators, and phase-locked loops.

SUMMARY

The present embodiments include an architecture for millimeter-wave frequency synthesis that is based on photomixing of two Kerr-soliton microcombs having different repetition rates and different pump frequencies. Advantageously, the present embodiments synthesize millimeter waves with respect to a microwave frequency standard such that the millimeter waves inherit the phase noise, accuracy, and frequency stability of the standard. While the millimeter-wave region of the electromagnetic spectrum occurs between 30 and 300 GHz, the present embodiments can be used to synthesize electromagnetic waves with higher frequencies (e.g., up to 1 THz) or lower frequencies (e.g., down to 1 GHz).

The present embodiments advantageously use nonlinear optical techniques to overcome several limitations of all-electronic millimeter-wave frequency synthesis. In addition to improved tuning range and noise, the recent development of microresonator-based dissipative Kerr solitons (DKS) enables compact and efficient frequency-comb generation, which makes a chip-scale millimeter-wave frequency synthesizer possible. Initial results from a dual-microresonator chip-scale system are presented below.

To assist with synthesis of the highest frequencies (i.e., over 100 GHz), a high-speed modified uni-traveling carrier photodiode may be used for photomixing. This type of photodiode has been recently shown to operate at frequencies up to 160 GHz (−3 dB bandwidth), and has a theoretical transit-time limited bandwidth of several hundred gigahertz. However, the present embodiments may implement photomixing with another type of high-speed photodiode without departing from the scope hereof.

In embodiments, a method for millimeter-wave frequency synthesis includes modulating a single-frequency laser beam to generate a multi-component pump beam having a first pump component at a first pump frequency and a second pump component at a second pump frequency. The method also includes simultaneously coupling the multi-component pump beam into first and second microresonators such that (i) the first microresonator converts the first pump component into a first microcomb having a first repetition rate and (ii) the second microresonator converts the second pump component into a second microcomb having a second repetition rate different from the first repetition rate. The method also includes detecting a first pair of comb lines of the first and second microcombs to generate a low-frequency beat note, the first pair of comb lines having an identical first index. The method also includes stabilizing a difference between the first and second repetition rates by phase-locking the low-frequency beat note to a phase-lock reference signal, said phase-locking including identically tuning the first and second pump frequencies prior to said simultaneously coupling. The method also includes photomixing a second pair of comb lines of the first and second microcombs to generate a millimeter wave, the second pair of comb lines having an identical second index different from the first index. A millimeter-wave frequency of the millimeter wave is based on (i) a difference between the first and second pump frequencies, (ii) the difference between the first and second repetition rates, and (iii) the second index.

In other embodiments, a millimeter-wave frequency synthesizer includes a modulator that modulates a single-frequency laser beam to generate a multi-component pump beam having a first pump component at a first pump frequency and a second pump component at a second pump frequency. The millimeter-wave frequency synthesizer also includes a first microresonator that, when excited by the multi-component pump beam, converts the first pump component into a first microcomb having a first repetition rate. The millimeter-wave frequency synthesizer also includes a second microresonator that, when excited by the multi-component pump beam, converts the second pump component into a second microcomb having a second repetition rate different from the first repetition rate. The millimeter-wave frequency synthesizer also includes a low-speed photodiode that detects a first pair of comb lines of the first and second microcombs to generate a low-frequency beat note, the first pair of comb lines having an identical first index. The millimeter-wave frequency synthesizer also includes a phase-lock loop that stabilizes a difference between the first and second repetition rates by phase-locking the low-frequency beat note to a phase-lock-loop reference signal. The phase-lock loop includes a frequency shifter that identically tunes the first and second pump frequencies prior to exciting the first and second microresonators. The millimeter-wave frequency synthesizer also includes a high-speed photodiode that photomixes a second pair of comb lines of the first and second microcombs to generate a millimeter wave. The second pair of comb lines has an identical second index different from the first index. A millimeter-wave frequency of the millimeter wave is based on (i) a difference between the first and second pump frequencies, (ii) the difference between the first and second repetition rates, and (iii) the second index.

DETAILED DESCRIPTION OF THE EMBODIMENTS

Figure 1:
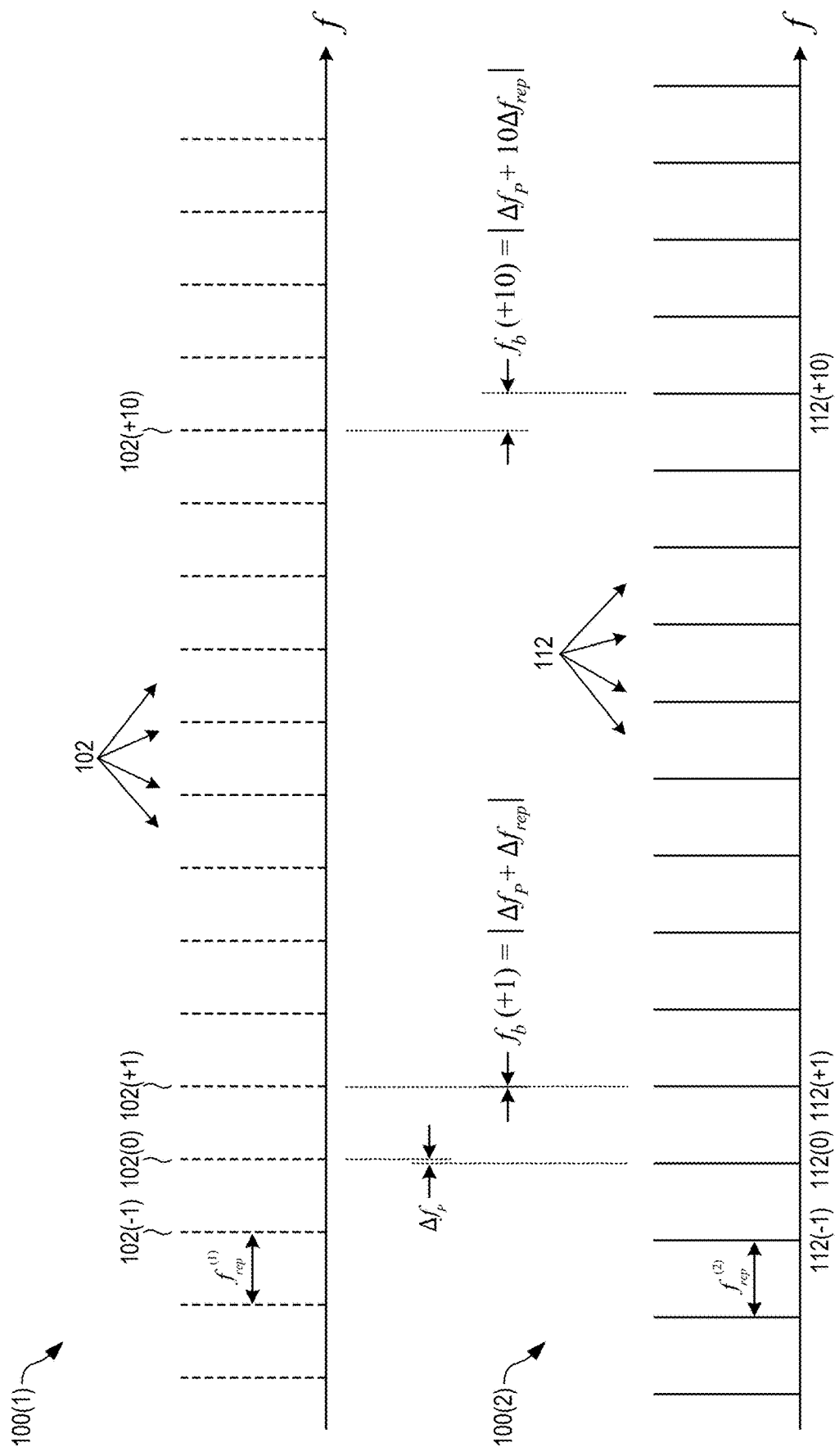
FIG. 1 illustrates a method for synthesizing millimeter waves by photomixing a first microcomb and a second microcomb, in an embodiment.

FIG. 1 illustrates a method for synthesizing millimeter waves by photomixing a first microcomb 100(1) and a second microcomb 100(2). The first microcomb 100(1) has a plurality of first-comb lines 102 that are equally spaced in frequency by a first repetition rate $f_{rep}^{(1)}$. Each of the first-comb lines 102 is uniquely identified by a first index n, which may be any positive integer, negative integer, or zero. For clarity in FIG. 1, only the first-comb lines 102(−1), 102(0), 102(+1), and 102(+10) are labeled. However, there may be thousands of first-comb lines 102, or more, extending to higher and lower frequencies than shown in FIG. 1. The first microcomb 100(1) is generated by coupling a first pump beam into a first microresonator, which coherently transfers energy from the first pump beam to the first-comb lines 102. The first index n is defined such that a zeroth first-comb line 102(0) with n=0 has a frequency that equals a first pump frequency $f_P^{(1)}$ of the first pump beam. With this definition of n, the first-comb lines 102 have first-comb frequencies $f_n^{(1)}$ given by $$f_n^{(1)} = f_P^{(1)} + n f_{rep}^{(1)} \quad (1)$$

Thus, a zeroth first-comb frequency $f_0^{(1)}$ of the zeroth first-comb line 102(1) equals the first pump $f_P^{(1)}$, i.e., $f_0^{(1)} = f_P^{(1)}$.

Similarly, the second microcomb 100(2) has a plurality of second-comb lines 112 that are equally spaced in frequency by a second repetition rate $f_{rep}^{(2)}$ that is different from the first repetition rate $f_{rep}^{(1)}$. Each of the second-comb lines 102 is uniquely identified by a second index m, which may be any positive integer, negative integer, or zero. For clarity in FIG. 1, only the second-comb lines 112(−1), 112(0), 112(+1), and 112(+10) are labeled. However, there may be thousands of second-comb lines 112, or more, extending to higher and lower frequencies than shown in FIG. 1. The second microcomb 100(2) is generated by coupling a second pump beam into a second microresonator, which coherently transfers energy from the second pump beam into to the second-comb lines 112. The second index m is defined such that a zeroth second-comb line 112(0) with m=0 has a frequency that equals a second pump frequency $f_P^{(2)}$ of the second pump beam. With this definition of m, the second-comb lines 112 have second-comb frequencies $f_m^{(2)}$ given by $$f_m^{(2)} = f_P^{(2)} + m f_{rep}^{(2)}. \quad (2)$$

Thus, a zeroth second-comb frequency $f_0^{(2)}$ of the zeroth second-comb line 112(0) equals the second pump frequency $f_P^{(2)}$, i.e., $f_0^{(2)} = f_P^{(2)}$.

The microcombs 100(1) and 100(2) may be photomixed by spatially overlapping on a photodiode. Interference between the microcombs 100(1) and 100(2) gives rise a spectrum of beat notes with frequencies:

$$f_b(n,m) = |f_n^{(1)} - f_m^{(2)}| = |f_P^{(1)} + n f_{rep}^{(1)} - f_P^{(2)} + m f_{rep}^{(2)}|. \quad (3)$$

Considering only the beat notes for which the indices m and n are equal, Eqn. 3 simplifies to:

$$f_b(n) = |\Delta f_P + n \Delta f_{rep}| \quad (4)$$

where $\Delta f_P = f_P^{(1)} - f_P^{(2)}$ is the difference in first and second pump frequencies and $\Delta f_{rep} = f_{rep}^{(1)} - f_{rep}^{(2)}$ is the difference in first and second repetition rates. A beat note whose frequency is given by Eqn. 4 is described herein as being generated by a pair of comb lines having the same index n, i.e., the first-comb line 102(n) and the second-comb line 112(n). Accordingly, each first-comb line 102(n) has a unique corresponding second-comb line 112(n). Note that Eqns. 3 and 4 do not include beat notes between the first-comb lines 102, which occur at the first repetition rate $f_{rep}^{(1)}$ and its harmonics, and beat notes between the second-comb lines 112, which occur at the second repetition rate $f_{rep}^{(2)}$ and its harmonics.

It is also assumed that $\Delta f_P$ and $\Delta f_{rep}$ have different signs, which occurs when (i) $f_P^{(1)} > f_P^{(2)}$ and $f_{rep}^{(1)} < f_{rep}^{(2)}$ (as shown in FIG. 1) or (ii) $f_P^{(1)} < f_P^{(2)}$ and $f_{rep}^{(1)} > f_{rep}^{(2)}$. When $|\Delta f_P| \approx |\Delta f_{rep}|$, some of the beat-note frequencies $f_b(n)$ may be small enough (typically 50 GHz or less) to detect electronically using a conventional photodiode (e.g., PIN photodiodes). Such a conventional photodiode is referred to herein as a "low-speed photodiode", and a beat note whose frequency $f_b(n)$ is low enough to be detected with a low-speed photodiode is referred to herein as a "low-frequency beat note". As an example of a low-frequency beat-note, consider $\Delta f_P = +50.0$ GHz and $\Delta f_{rep} = -49.9$ GHz. In this case, the beat note generated by the pair of comb lines 102(+1) and 112(+1) has a frequency $f_b(+1) = 100$ MHz. FIG. 1 illustrates this example by showing the beat-note frequency $f_b(+1) = |\Delta f_P + \Delta f_{rep}|$ between the comb lines 102(+1) and 112(+1). As another example, consider $\Delta f_P = -35.0$ GHz and $\Delta f_{rep} = +34.0$ GHz. In this case, the pair of comb lines 102(−1) and 112(−1) generates a low-frequency beat note at $f_b(-1) = 1$ GHz. Note that the pump frequencies $f_P^{(1)}$ and $f_P^{(2)}$ and repetition rates $f_{rep}^{(1)}$ and $f_{rep}^{(2)}$ may be selected such that a different pair of comb lines (i.e., for n≠±1) generates a low-frequency beat note.

In some embodiments, the microcombs 110(1) and 110(2) are configured by selecting values of $f_P^{(1)}$, $f_{rep}^{(1)}$, $f_P^{(2)}$, and $f_{rep}^{(2)}$ such that the low-frequency beat note as a frequency of 50 GHz or less, and therefore can be detected using a low-speed photodiode. In some of these embodiments, the microcombs 110(1) and 110(2) are configured such that the low-frequency beat note has an even smaller frequency, such as 1 GHz or less.

In some of the present embodiments, it is assumed that $|\Delta f_P| < f_{rep}^{(1)}/2$ and $|\Delta f_P| < f_{rep}^{(2)}/2$. In this case, the first-comb line 102 closest in frequency to the zeroth second-comb line 112(0) is the zeroth first-comb line 102(0), and vice versa. With this assumption, the low-frequency beat note will be formed by the pair of comb lines having the same index n=+1 or n=−1. When this assumption is not met (i.e., $|\Delta f_P| > f_{rep}^{(1)}/2$ and $|\Delta f_P| > f_{rep}^{(2)}/2$, the low-frequency beat note may be formed by a pair of comb lines having the same index n≠±1.

For most values of n, the beat-note frequencies $f_b(n)$ are too high to be detected with a low-speed photodiode. For example, FIG. 1 shows the beat-note frequency $f_b(+10)$, which is generated by the pair of comb lines having n=+10. Assuming $\Delta f_P$=+50.0 GHz and $\Delta f_{rep}$=−49.9 GHz, $f_b(+10)$ =449 GHz. The beat note can be detected using a high-speed photodiode that can detect frequencies up to several hundred gigahertz, or more. For example, the high-speed photodetector could be a modified uni-traveling carrier photodiode. However, another type of high-speed photodiode or photodetector may be used without departing from the scope hereof. A beat note whose frequency $f_b(n)$ is too high to be detected with a low-speed photodiode, yet small enough to be electronically detected by a high-speed photodiode, is referred to herein as a "high-frequency beat note". While FIG. 1 shows a high-frequency beat note being generated by a pair of comb lines whose frequencies are higher than the frequencies $f_0^{(1)}$ and $f_0^{(2)}$, the high-frequency beat note could alternatively be generated by a pair of comb lines whose frequencies are lower than the frequencies $f_0^{(1)}$ and $f_0^{(2)}$.

In the present embodiments, both a low-frequency beat note and a high-frequency beat note are detected using different spectral portions of the microcombs 110(1) and 110(2). By phase-locking the low-frequency beat note to a microwave frequency reference, the frequency characteristics of the frequency reference are transferred to all of the beat notes, including the high-frequency beat note. Therefore, a millimeter wave synthesized using the present embodiments inherits the accuracy and stability of the frequency reference. Herein, the term "frequency characteristics" includes any metric that quantifies timing and/or frequency performance of the frequency reference. Examples of frequency characteristics include, but are not limited to, Allan variance, fractional frequency instability, absolute frequency accuracy, phase noise, and timing jitter.

Figure 2:
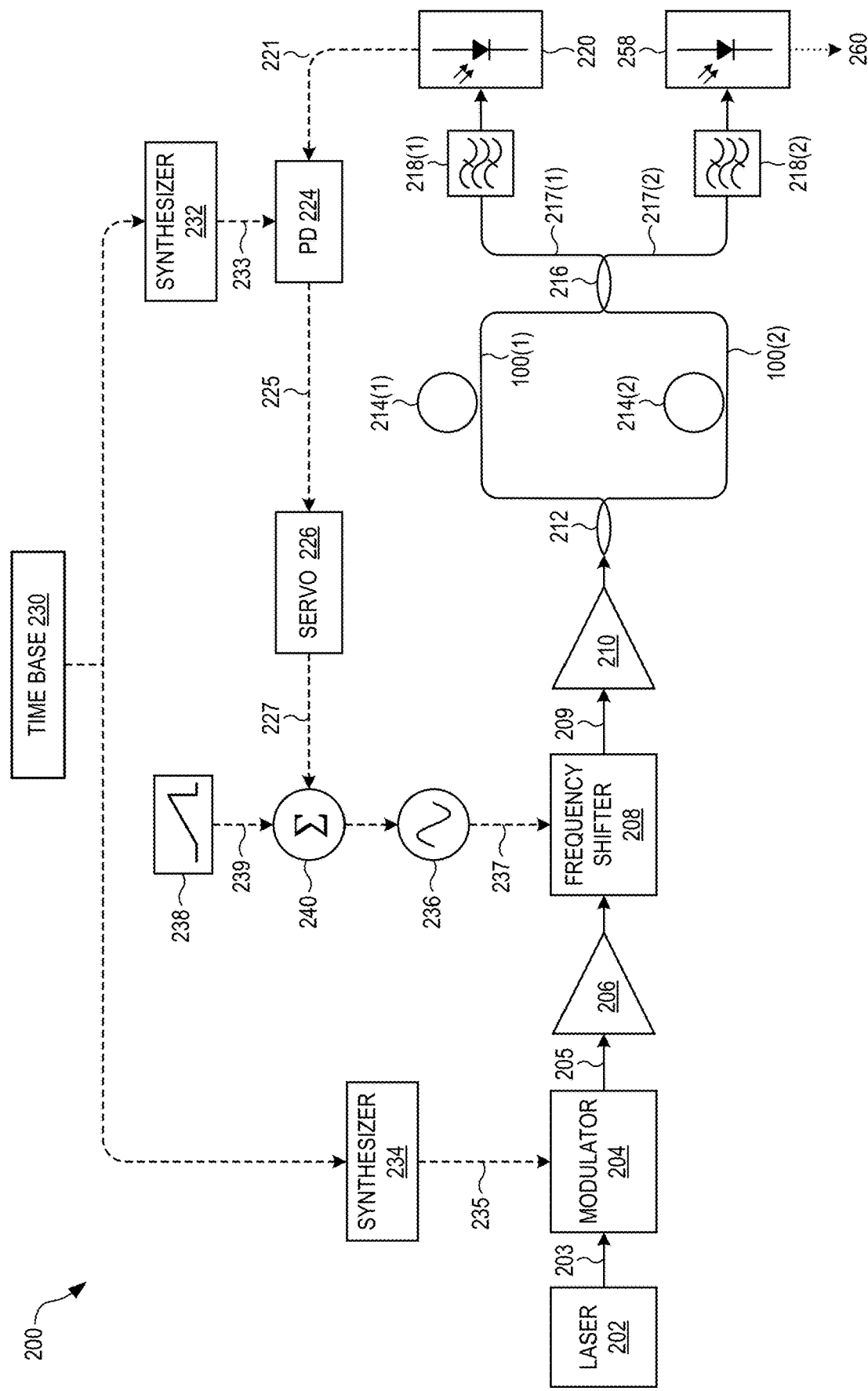
FIG. 2 is a functional diagram of a millimeter-wave frequency synthesizer that implements the photomixing shown in FIG. 1, in an embodiment.

FIG. 2 is a functional diagram of a millimeter-wave frequency synthesizer 200 that implements the photomixing shown in FIG. 1. FIG. 2 illustrates how a low-frequency beat note may be detected and phase-locked to a microwave frequency reference such that the frequency characteristics of the microwave frequency reference are transferred to a high-frequency beat note. For clarity in FIG. 2, optical signals are indicated by solid lines, low-frequency (i.e., microwave frequencies or less) electrical signals are indicated by dashed lines, and high-frequency millimeter waves are indicated by dotted lines.

The millimeter-wave frequency synthesizer 200 includes a laser 202 that outputs a continuous-wave (cw) single-frequency laser beam 203. The laser 202 may be a diode laser, fiber laser, external-cavity laser, or any other kind of coherent light source that can generate the cw single-frequency laser beam 203. The single frequency of the laser beam 203 may correspond to any wavelength that can be used to pump a microresonator to generate a microcomb. In particular, the wavelength may be near 1550 nm, in which case the optical components in FIG. 2 may be fiber-optic-based, thereby benefitting from low-loss and readily available telecom optical fiber and associated components. However, the wavelength may lie elsewhere in the infrared, or a different region of the electromagnetic spectrum (e.g., optical, ultraviolet, etc.), without departing from the scope hereof. Accordingly, optical components in FIG. 2 may be free-space or fiber-optic-based.

Figure 4:
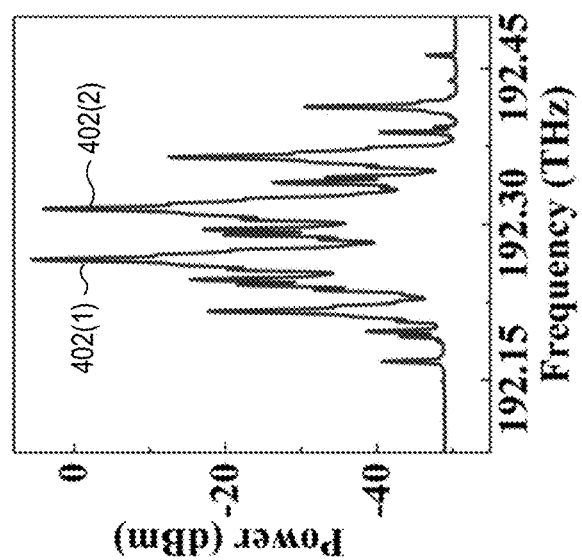
FIG. 4 shows the optical spectrum of pumps generated by the setup of FIG. 3.

The millimeter-wave frequency synthesizer 200 also includes a modulator 204 that, when electrically driven with a modulation signal 235, converts the cw single-frequency laser beam 203 into a multi-component pump beam 205 having a first pump component at a first pump-component frequency and a second pump component at a second pump-component frequency (see the first pump component 402(1) and second pump component 402(2) in FIG. 4). In one embodiment, the modulator 204 is an intensity modulator and the modulation signal 235 has a frequency of $\Delta f_P/2$. In this embodiment, the amplitude of the modulation signal 235 (i.e., the modulation depth) may be selected such that the ±1 sidebands have more power than all other components of the multi-component pump beam 205. The ±1 sidebands serve as the first and second pump components and are separated in frequency by $\Delta f_P$. In another embodiment, the modulator 204 is a phase or frequency modulator that is also driven at a frequency of $\Delta f_P/2$ and with a modulation depth such that the ±1 sidebands have more power than all other components of the multi-component pump beam 205. In yet another embodiment, the laser 202 is a diode laser whose drive current is modulated at the frequency $\Delta f_P/2$ to generate the ±1 sidebands. In this embodiment, the modulator 204 is not needed. A different modulation scheme or frequency-generation technique may be used to create the first and second pump components from the laser beam 203 without departing from the scope hereof.

As shown in FIG. 2, a modulation frequency synthesizer 234 generates the modulation signal 235. The modulation frequency synthesizer 234 may be referenced to a time base 230, such as a microwave frequency reference (e.g., a rubidium standard), atomic clock (e.g., based on cesium), quartz oscillator, hydrogen maser, etc. In this case, the modulation signal 235 inherits the frequency characteristics of the time base 230. Driving the modulator 204 with this time-base-referenced modulation signal 235 thereby ensures that the frequency difference $\Delta f_P$ between the first and second pump components is fixed with respect to the time base 230.

The millimeter-wave frequency synthesizer 200 also includes a frequency shifter 208 that, when electrically driven by a drive signal 237 having a frequency $f_s$, identically shifts both of the first and second pump-component frequencies by $f_s$. Specifically, the frequency shifter 208 (i) shifts the first pump-component frequency by $f_s$ such that the first pump component has the first pump frequency $f_P^{(1)}$ and (ii) shifts the second pump-component frequency by $f_s$ such that the second pump component has the second pump frequency $f_P^{(2)}$. Thus, the term "identically" means that the frequency shifter 208 simultaneously shifts the frequencies of the first and second pump components by the same amount, thereby ensuring that $\Delta f_P$ is unaffected. The output of the frequency shifter 208 is a frequency-shifted pump beam 209.

In one embodiment, the frequency shifter 208 is a single-sideband carrier-suppressed modulator. In another embodiment, the frequency shifter 208 is an acousto-optic modulator or electro-optic modulator. The frequency shifter 208 may be another type of modulator or frequency-shifting optical component without departing from the scope hereof. The drive signal 237 is generated by a variable-frequency oscillator 236 that is controlled to change the frequency of the drive signal 237. For example, the variable-frequency oscillator 236 may be a wideband voltage-controlled oscillator (e.g., capable of generating 100 GHz/µs scans over a 4

GHz range). If additional optical power is needed, an amplifier 206 may be used to amplify the multi-component pump beam 205 after the modulator 204. Alternatively or additionally, an amplifier 210 may be used to amplify the frequency-shifted pump beam 209 after the frequency shifter 208. Each of the amplifiers 206 and 210 may be a semiconductor optical amplifier, a fiber amplifier (e.g., an erbium-doped fiber amplifier) or another type of optical amplifier known in the art.

In some embodiments, the frequency shifter 208 precedes the modulator 204, in which case the frequency-shifted pump beam 209 is single-frequency. In these embodiments, the laser beam 203 is first frequency-shifted according to the drive signal 237, after which it is modulated according to the modulation signal 235. In other embodiments, the modulator 204 is replaced by a second laser whose output is offset-locked to the laser beam 203 by $\Delta f_P$. The outputs of the laser 202 and the second laser may be combined to form the multi-component pump beam 205. Alternatively, the second laser may be offset-locked to the frequency-shifted pump beam 209 (i.e., after the frequency shifter 208). Another phase-locking technique may be used to create the first and second pump components without departing from the scope hereof.

The frequency shifter 208 outputs a frequency-shifted pump beam 209 that is split into two paths by a splitter 212. In the first path, a first microresonator 214(1) is pumped by the first pump component to generate the first microcomb 100(1) of FIG. 1. In the second path, a second microresonator 214(2) is pumped by the second pump component to generate the second microcomb 100(2) of FIG. 2. The microcombs 100(1) and 100(2) are combined by a splitter 216 that outputs a first photomixing signal 217(1) to a low-speed photodiode 220 and a second photomixing signal 217(2) to a high-speed photodiode 258. Each of the photomixing signals 217(1) and 217(2) contains portions of both microcombs 100(1) and 100(2). To improve the signal-to-noise ratios of the beat signals, a first filter 218(1) may be used to selectively transmit to the low-speed photodiode 220 only the one pair of comb lines that generate a low-frequency beat note 221. Similarly, a second filter 218(2) may be used to selectively transmit to the high-speed photodiode 258 only the one pair of comb lines that generate a high-frequency beat note 260. The low-frequency beat note 221 has a low beat frequency $f_b^{(low)}$ while the high-frequency beat note 260 has a high beat frequency $f_b^{(high)}$. The beat frequencies $f_b^{(low)}$ and $f_b^{(high)}$ are both examples of beat-note frequencies described by Eqn. 4.

To phase-lock the low-frequency beat note 221, it is first compared to a phase-lock-loop (PLL) reference signal 233 using a phase detector 224. For example, the phase detector 224 may be a digital phase/frequency detector used for digital PLLs, or a mixer used for analog PLLs. The phase detector 224 outputs a phase error signal 225 that is processed by a servo circuit 226 to generate a correction signal 227 that controls the variable-frequency oscillator 236 to change the frequency of the drive signal 237. A PLL frequency synthesizer 232 generates the PLL reference signal 233. The PLL frequency synthesizer 232 may be referenced to the time base 230, thereby ensuring that the low beat frequency $f_b^{(low)}$ inherits the frequency characteristics of the time base 230 when the low-frequency beat note 221 is phase-locked.

To further appreciate how the phase-lock loop of the low-frequency beat note 221 is closed, we refer to Jordan R. Stone et al., "Thermal and Nonlinear Dissipative-Soliton Dynamics in Kerr-Microresonator Frequency Combs", Phys. Rev. Lett. 121, 063902 (2018). In this publication, the authors demonstrated that for certain detunings, the repetition rate of a microcomb varies linearly with pump frequency. Applying this to the present embodiments, the first microresonator 214(1) has a first tuning coefficient $K_1$ such that $f_{rep}^{(1)} = K_1 f_P^{(1)}$ and the second microresonator 214(2) has a second tuning coefficient $K_2$ such that $f_{rep}^{(2)} = K_2 f_P^{(2)}$. The microresonators 214(1) and 214(2) are configured and operated with different repetition rates and/or dispersion profiles such that $K_1 \neq K_2$. Thus, when the pump frequencies $f_P^{(1)}$ and $f_P^{(2)}$ are tuned identically, the difference in repetition rates will change by $\Delta f_{rep} \propto (K_1 - K_2)$ while the difference in pump frequencies $\Delta f_P$ remains fixed. Accordingly, when the low-frequency beat note 221 is phase-locked, both $f_b^{(low)}$ and $\Delta f_P$ will inherit the frequency characteristics of the time base 230. From Eqn. 4, it therefore follows that $\Delta f_{rep}$ will also inherit the frequency characteristics of the time base 230, as will the high beat frequency $f_b^{(high)}$.

When the low-frequency beat note 221 is phase-locked, the high-frequency beat note 260 serves as a synthesized millimeter wave. Although not shown in FIG. 2, the synthesized millimeter wave may be filtered, amplified, conducted along a transmission line (to a load), or otherwise used as needed for the application at hand.

In some embodiments, the millimeter-wave frequency synthesizer 200 includes a ramp generator 238 that outputs a ramp signal 239 to the frequency shifter 208. The ramp generator 238 may be an arbitrary waveform generator or function generator. The ramp signal 239 may be configured to initiate soliton propagation (i.e., microcomb generation) in the microresonators 214(1) and 214(2). For example, the ramp signal 239 have a slope and temporal duration to simultaneously ramp (i) the first pump frequency from blue-detuning to red-detuning, relative to a cold cavity resonance frequency of the first microresonator 214(1) and (ii) the second pump frequency from blue-detuning to red-detuning, relative to a cold cavity resonance frequency of the second microresonator 214(2). Although not shown in FIG. 2, each microresonator 214 may be located proximate to a thermoelectric cooler that, when electrically driven, heats or cools the microresonator 214. Changing the temperatures of the microresonators 214 shifts their resonance frequencies, thereby ensuring that the same ramp can be used to simultaneously initiate soliton propagation in both of the microresonators 214(1) and 214(2).

As shown in FIG. 2, the ramp signal 239 is added to the correction signal 227 using an adder circuit 240. The ramp signal 239 is only applied while initiating soliton propagation (i.e., no correction signal 227 is applied oscillator 236 during this process). Once soliton propagation has been successfully initiated in both of the microresonators 214(1) and 214(2), the ramp signal 239 is stopped and the correction signal 227 is started. In an embodiment, the adder circuit 240 is replaced by a switch that is controlled to switch between the correction signal 227 and the ramp signal 239. Other techniques to initiate soliton propagation and transition to phase locking may be used without departing from the scope hereof.

The present embodiments may be used with any type of microresonator capable of generating Kerr microcombs. For example, each of the microresonators 214(1) and 214(2) may be a ring resonator, a whispering gallery mode resonator, a microsphere, or a compact fiber cavity. Each of the microresonators 214(1) and 214(2) may be fabricated from calcium fluoride ($CaF_2$), magnesium fluoride ($MgF_2$), silica, aluminum nitride, diamond, silicon, silicon nitride ($Si_3N_4$), or another material used for Kerr-comb generation. The microresonators 214(1) and 214(2) may be stand-alone optical components or fully integrated into a photonic integrated circuit.

EXPERIMENTAL DEMONSTRATION

Figure 3:
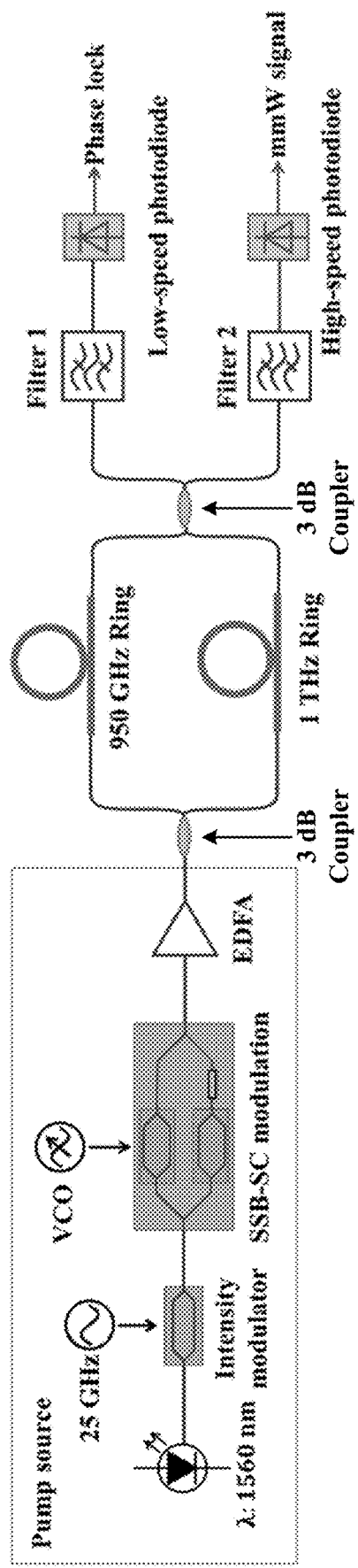
FIG. 3 shows a setup used to experimentally demonstrate the present embodiments.

FIG. 3 shows a setup used to experimentally demonstrate the present embodiments. The pump source consists of a cw laser at 1560 nm, an intensity modulator, a single-sideband suppressed-carrier (SSB-SC) modulator and an erbium-doped fiber amplifier (EDFA). Two sidebands separated in frequency $\Delta f_P$=50 GHz are generated through carrier-suppressed intensity modulation, and further serve as the pumps for two microresonators. The SSB-SC modulator is driven by a voltage-controlled oscillator (VCO), and fast pump frequency sweeping is realized by applying a ramp signal to the VCO.

FIG. 4 shows the optical spectrum of the pumps generated by the pump source of FIG. 3. The pump source generates a first pump component 402(1) and a second pump component 402(2) that are separated in frequency by $\Delta f_P$. The pump beam is further amplified by a high-power EDFA and sent to two silicon nitride microresonators. The free spectral range (FSR) of the two microresonators is 950 GHz and 1 THz, respectively. Their resonance is thermally tuned to match the above-mentioned two sidebands. If an appropriate ramp signal is applied to the VCO, soliton frequency combs could be generated in both microresonators.

Figure 5:
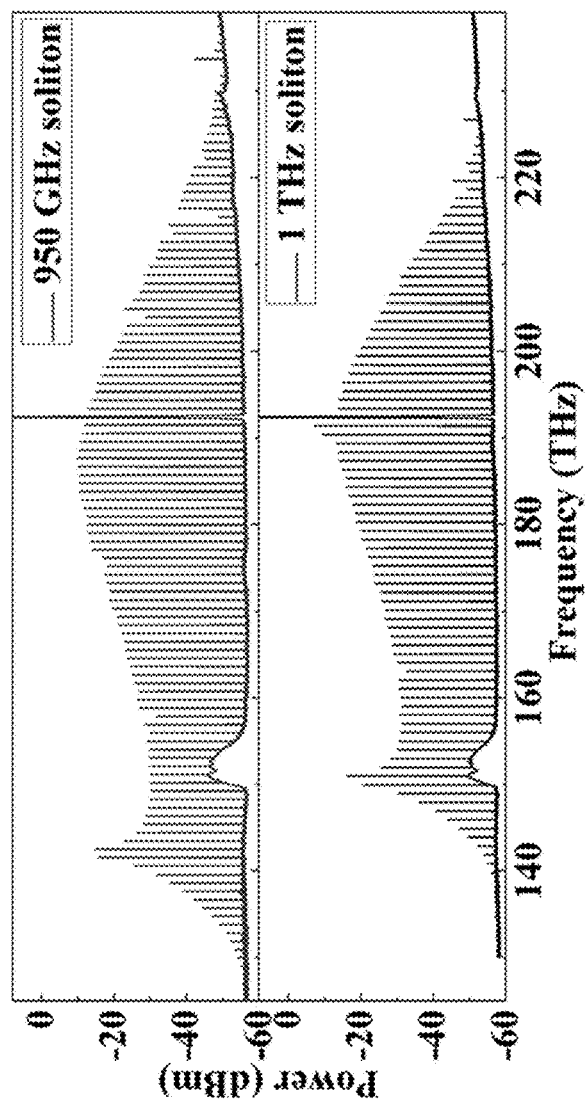
FIG. 5 shows the spectra of 950 GHz and 1 THz soliton microcombs generated by microresonators of the setup of FIG. 3.
Figure 6:
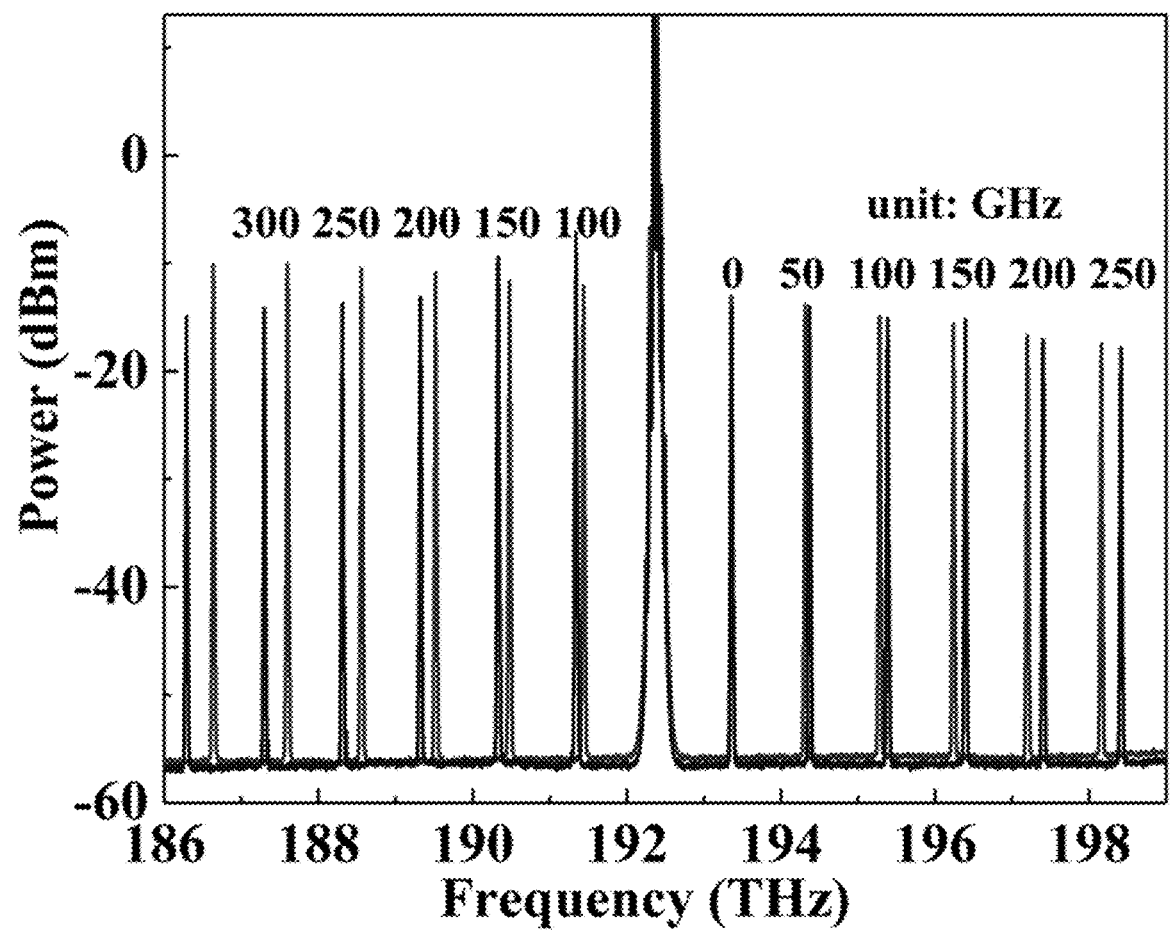
FIG. 6 shows the spectra of FIG. 5 in more detail.

FIG. 5 shows the spectra of 950 GHz and 1 THz soliton microcombs generated by the microresonators of FIG. 3. The two optical frequency combs are combined together by a 3-dB coupler. FIG. 6 shows the spectra of FIG. 5 in more detail. The frequency spacing for different pair of comb lines can be expressed as $\Delta f_N = \Delta f_P \pm N \Delta f_{rep}$, where $\Delta f_P \approx 50$ GHz is the FSR difference and N is an integer. In the higher-frequency side of the pump, spacing of the first pair is $\Delta f_1 = \Delta f_P - \Delta f_{rep} \approx 100$ MHz. This pair of comb lines is selected by optical filter 1 and detected by a low-speed photodiode. The beat signal is phase-locked to a low-frequency reference to stabilize $\Delta f_{rep}$. Other pairs for N>1 are selected by optical filter 2. After photodetection with a high-speed MUTC photodiode, a millimeter-wave signal at ~N×50 GHz could be generated. Also, their frequency can be tuned by changing the pump frequency difference $\Delta f_P$.

Figure 7:
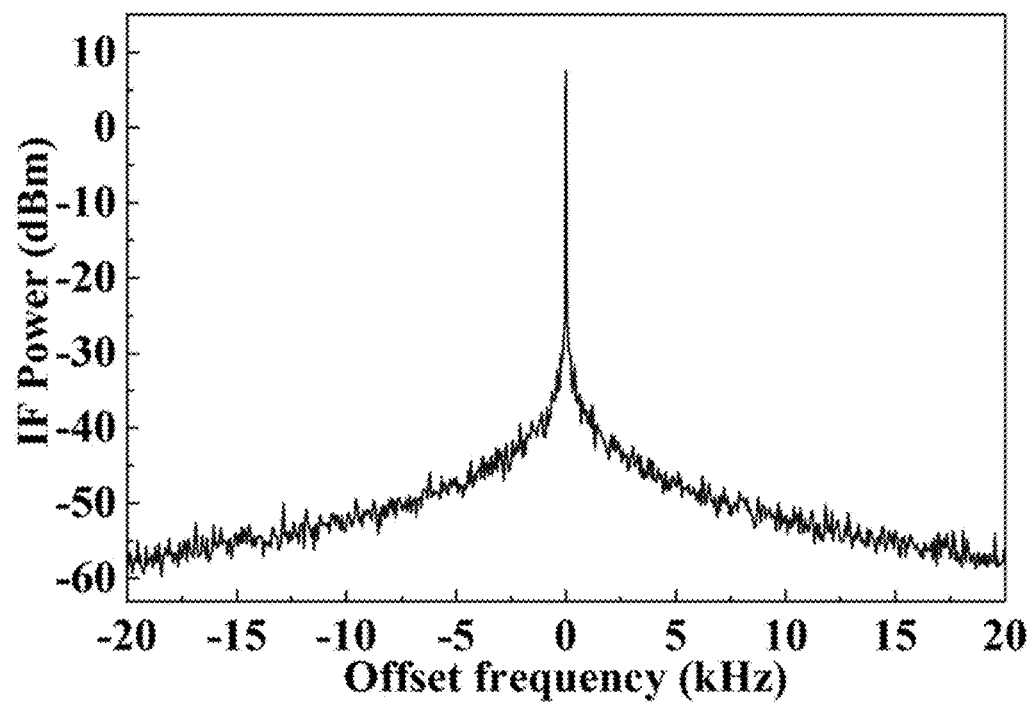
FIG. 7 shows the spectrum of a 150.8-GHz signal generated by the setup of FIG. 3, after down-converting to 124.8 MHz.
Figure 8:
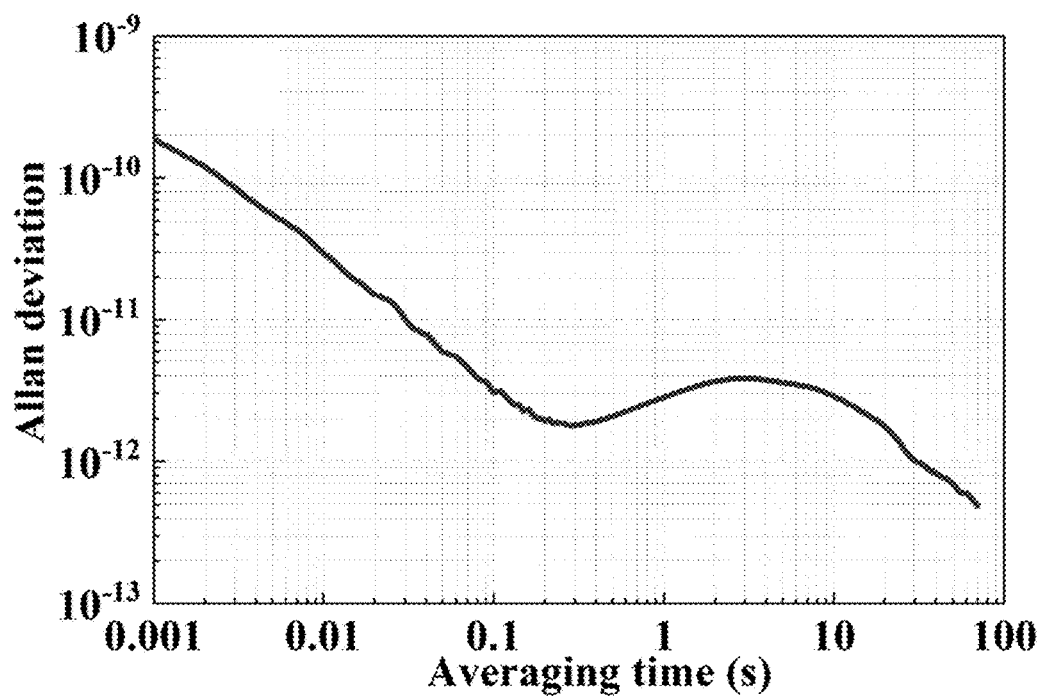
FIG. 8 shows the measured Allan deviation of the 150.8-GHz signal shown in FIG. 7.

Frequency stability and tunability are two figures of merit for the millimeter-wave frequency synthesizer 200. Using the setup of FIG. 3, we take the beat signal of the fourth pair of comb lines. Their frequency difference is approximately 150.8 GHz, and we use a harmonic mixer to down-convert this 150.8-GHz signal to 124.8 MHz. FIG. 7 shows the spectrum of the down-converted signal at 124.8 MHz. A single-frequency signal with SNR>65 dB is observed. FIG. 8 shows the measured Allan deviation (ADEV) of the 150.8-GHz signal. At an averaging time of one second, the ADEV is $3\times^{-12}$. The ADEV floor occurs at averaging times between 0.3 and 10 seconds, and may result from noise from the optical fiber.

Figure 9:
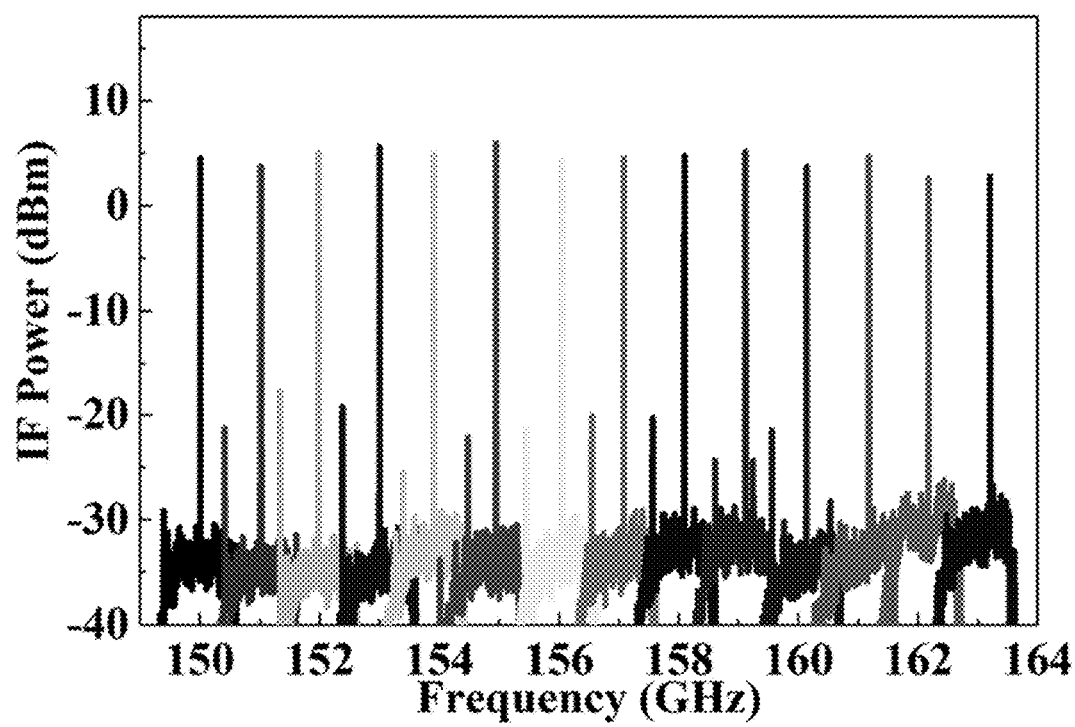
FIG. 9 shows coarse frequency tuning of a millimeter-wave signal from 150 GHz to 163 GHz in steps of 1 GHz.
Figure 10:
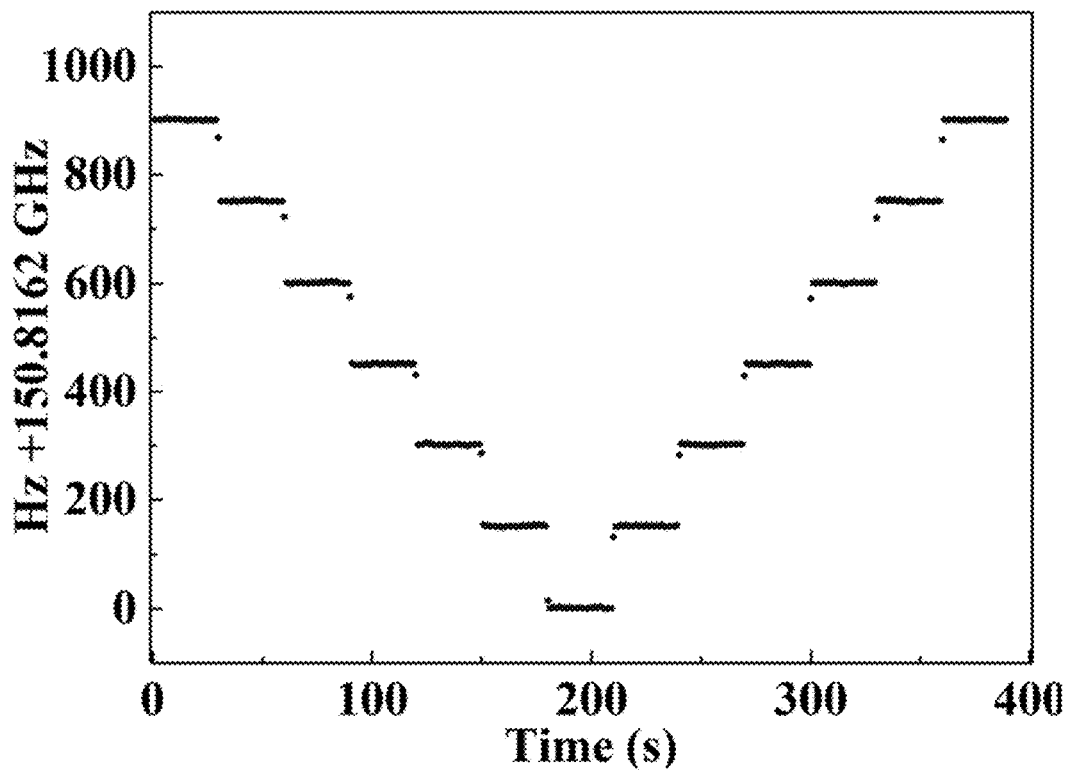
FIG. 10 shows bidirectional linear tuning of a 150.8162-GHz signal in steps of 150 Hz.

FIGS. 9 and 10 illustrating coarse and fine frequency tuning of the setup of FIG. 3. In FIG. 9, the frequency of a millimeter-wave signal is tuned from 150 GHz to 163 GHz in steps of 1 GHz. It should be noted that neither of the resonators lost soliton state during tuning. FIG. 10 shows bidirectional linear tuning of the 150.8162 GHz signal in steps of 150 Hz, which is measured by a frequency counter with a gate time of 1 second.

Figure 11:
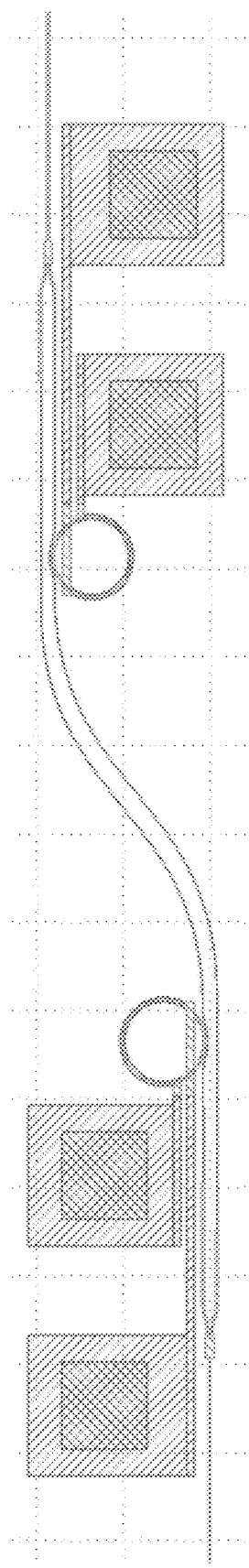
FIG. 11 is a mask design for two microresonator rings and heaters on one chip, in an embodiment.
Figure 13:
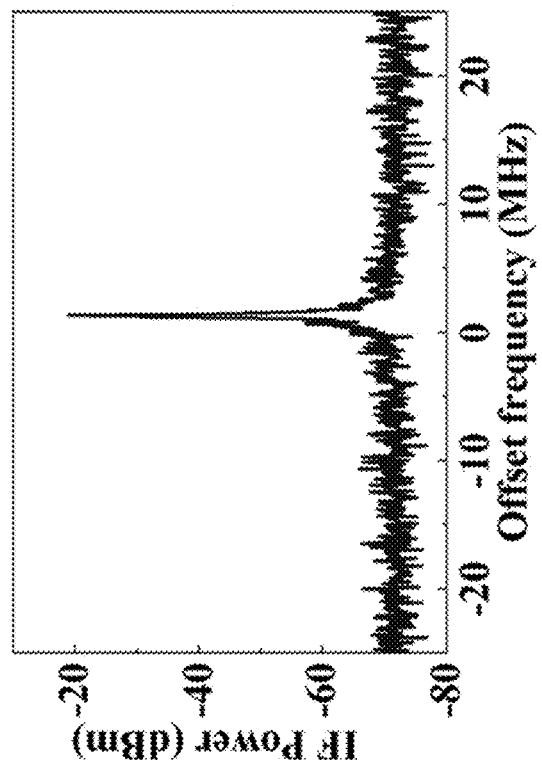
FIG. 13 shows the spectrum of a 146.968-GHz signal generated by the chip of FIG. 11.
Figure 12:
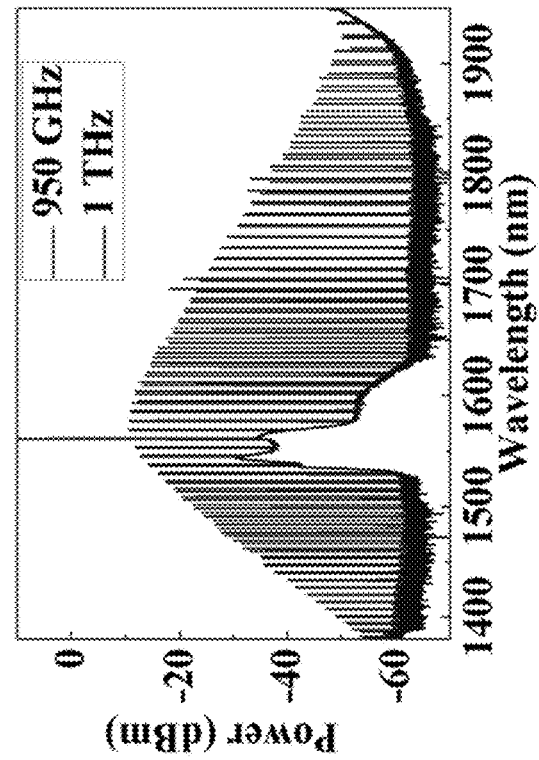
FIG. 12 shows spectra of 950 GHz and 1 THz soliton combs generated by the chip of FIG. 11.

The two microresonator rings in FIG. 3 may be integrated on one chip, an important step towards chip-scale integration of the whole system. As shown in FIG. 11, the 3-dB couplers in FIG. 3 are replaced by two multi-mode interference (MMI) couplers. The resonances of the microresonators can be tuned by applying different voltage to the on-chip heaters. FIG. 12 illustrates the generated 950 GHz and 1 THz soliton combs. As an example, the third pair of comb lines are selected by an optical bandpass filter and a millimeter-wave signal at 146.968 GHz is generated after photodetection by the high-speed photodiode. FIG. 13 shows the spectrum of the millimeter-wave signal after frequency down-conversion.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for millimeter-wave frequency synthesis, comprising:
    modulating a single-frequency laser beam to generate a multi-component pump beam having a first pump component at a first pump frequency and a second pump component at a second pump frequency;
    simultaneously coupling the multi-component pump beam into first and second microresonators such that (i) the first microresonator converts the first pump component into a first microcomb having a first repetition rate and (ii) the second microresonator converts the second pump component into a second microcomb having a second repetition rate different from the first repetition rate;
    detecting a first pair of comb lines of the first and second microcombs to generate a low-frequency beat note, the first pair of comb lines having an identical first index;
    stabilizing a difference between the first and second repetition rates by phase-locking the low-frequency beat note to a phase-lock reference signal, said phase-locking including identically tuning the first and second pump frequencies prior to said simultaneously coupling; and
    photomixing a second pair of comb lines of the first and second microcombs to generate a millimeter wave, the second pair of comb lines having an identical second index different from the first index;
    wherein a millimeter-wave frequency of the millimeter wave is based on (i) a difference between the first and second pump frequencies, (ii) the difference between the first and second repetition rates, and (iii) the second index.

2. The method of claim 1, wherein said photomixing includes photomixing the first and second microcombs with a modified uni-traveling carrier photodiode.

3. The method of claim 1, wherein said modulating includes:
    transmitting the single-frequency laser beam through an intensity modulator; and
    driving the intensity modulator with a modulation signal having a modulation frequency equal to one-half of the difference between the first and second pump frequencies.

4. The method of claim 3, further comprising:
    synthesizing the phase-lock reference signal with respect to a time base; and synthesizing the modulation signal with respect to the time base;
wherein the millimeter-wave frequency inherits frequency characteristics of the time base.

5. The method of claim 1, wherein said identically tuning includes:
transmitting the multi-component pump beam through a frequency shifter; and
driving the frequency shifter with a drive signal having a drive frequency;
wherein the frequency shifter shifts both of the first and second pump frequencies by the drive frequency.

6. The method of claim 5, wherein said transmitting the multi-component pump beam through a frequency shifter includes transmitting the multi-component pump beam through a single-sideband suppressed-carrier modulator.

7. The method of claim 1, wherein:
said identically tuning generates a frequency-shifted pump beam; and
said simultaneously coupling includes simultaneously coupling the frequency-shifted pump beam into the first and second microresonators.

8. The method of claim 1, further comprising simultaneously ramping the first and second pump frequencies, prior to said simultaneously coupling, to generate solitons in each of the first and second microresonators.

9. The method of claim 1, wherein the millimeter-wave frequency is between 0.05 and 1 THz.

10. The method of claim 1, wherein the low-frequency beat note has a frequency of 1 GHz or less.

11. The method of claim 1, wherein:
the absolute value of the difference between the first and second pump frequencies is (i) less than one-half of the first repetition rate and (ii) less than one-half of the second repetition rate;
such that the identical first index is either +1 or −1.

12. A millimeter-wave frequency synthesizer, comprising:
a modulator that modulates a single-frequency laser beam to generate a multi-component pump beam having a first pump component at a first pump frequency and a second pump component at a second pump frequency;
a first microresonator that, when excited by the multi-component pump beam, converts the first pump component into a first microcomb having a first repetition rate;
a second microresonator that, when excited by the multi-component pump beam, converts the second pump component into a second microcomb having a second repetition rate different from the first repetition rate;
a low-speed photodiode that detects a first pair of comb lines of the first and second microcombs to generate a low-frequency beat note, the first pair of comb lines having an identical first index;
a phase-lock loop that stabilizes a difference between the first and second repetition rates by phase-locking the low-frequency beat note to a phase-lock-loop reference signal, the phase-lock loop including a frequency shifter that identically tunes the first and second pump frequencies prior to exciting the first and second microresonators; and
a high-speed photodiode that photomixes a second pair of comb lines of the first and second microcombs to generate a millimeter wave, the second pair of comb lines having an identical second index different from the first index;
wherein a millimeter-wave frequency of the millimeter wave is based on (i) a difference between the first and second pump frequencies, (ii) the difference between the first and second repetition rates, and (iii) the second index.

13. The millimeter-wave frequency synthesizer of claim 12, wherein the high-speed photodiode is a modified uni-traveling carrier photodiode.

14. The millimeter-wave frequency synthesizer of claim 12,
further comprising a modulation frequency synthesizer that synthesizes a modulation signal having a modulation frequency equal to one-half of the difference between the first and second pump frequencies;
wherein the modulator is an intensity modulator driven by the modulation signal.

15. The millimeter-wave frequency synthesizer of claim 14, wherein:
the phase-lock loop includes a phase-lock-loop frequency synthesizer that synthesizes the phase-lock-loop reference signal with respect to a time base; and
the modulation frequency synthesizer synthesizes the modulation signal with respect to the time base;
such that the millimeter-wave frequency has frequency characteristics determined by the time base.

16. The millimeter-wave frequency synthesizer of claim 12, further comprising a driver that drives the frequency shifter with a drive signal having a drive frequency such that the frequency shifter shifts both of the first and second pump frequencies by the drive frequency.

17. The millimeter-wave frequency synthesizer of claim 12, the frequency shifter being a single-sideband suppressed-carrier modulator.

18. The millimeter-wave frequency synthesizer of claim 12, further comprising a ramp generator that outputs a ramp signal to simultaneously ramp the first and second pump frequencies, prior to exciting the first and second microresonators, to generate solitons in each of the first and second microresonators.

19. The millimeter-wave frequency synthesizer of claim 12, wherein the millimeter-wave frequency is between 0.05 and 1 THz.

20. The millimeter-wave frequency synthesizer of claim 12, wherein the low-frequency beat note has a frequency of 1 GHz or less.

* * * * *